United States Patent

Kao et al.

[11] Patent Number: 6,148,194
[45] Date of Patent: Nov. 14, 2000

[54] METHOD FOR DETERMINING CELL BOUNDARY DURING BASE STATION DEPLOYMENT

[75] Inventors: Joel Kao, San Diego, Calif.; Roland A. Smith; William Bird, both of Nepean, Canada

[73] Assignee: Nortel Networks Corporation, Montreal, Canada

[21] Appl. No.: 08/988,086

[22] Filed: Dec. 10, 1997

[51] Int. Cl.[7] .......................... H04M 11/00; H04B 17/00
[52] U.S. Cl. .................... 455/421; 455/446; 455/423; 455/67.1
[58] Field of Search .................... 455/423, 446, 455/449, 67.1, 67.4, 561, 67.7, 421, 67.3

[56] References Cited

U.S. PATENT DOCUMENTS

| | | | |
|---|---|---|---|
| 5,070,536 | 12/1991 | Mahany et al. | 455/67.1 |
| 5,271,000 | 12/1993 | Engbersen et al. | 370/13 |
| 5,373,548 | 12/1994 | McCarthy | 455/421 |
| 5,384,791 | 1/1995 | Klein | 455/67.3 |
| 5,386,589 | 1/1995 | Kanai | 455/33.1 |
| 5,448,616 | 9/1995 | Kaewell, Jr. et al. | 455/67.1 |
| 5,463,673 | 10/1995 | Hersovici | 379/59 |
| 5,483,669 | 1/1996 | Barnett et al. | 455/437 |
| 5,539,803 | 7/1996 | Bhat et al. | 455/423 |
| 5,551,058 | 8/1996 | Hutcheson et al. | 455/33.2 |
| 5,768,689 | 6/1998 | Borg | 455/67.4 |
| 5,802,473 | 9/1998 | Rutledge et al. | 455/441 |
| 5,805,667 | 9/1998 | Alvarez et al. | 455/67.2 |
| 5,870,666 | 2/1999 | Tanaka et al. | 455/67.1 |
| 5,878,328 | 3/1999 | Chawia et al. | 455/67.1 |
| 5,884,163 | 3/1999 | Hardouin | 455/423 |
| 5,924,029 | 7/1999 | Sohngen et al. | 455/423 |
| 5,926,762 | 7/1999 | Arpee et al. | 455/447 |
| 5,991,901 | 11/1999 | Mulford et al. | 455/421 |

FOREIGN PATENT DOCUMENTS

| | | | |
|---|---|---|---|
| 768804 | 4/1997 | European Pat. Off. | H04Q 7/38 |

*Primary Examiner*—Nguyen Vo
*Assistant Examiner*—Duc Nguyen

[57] ABSTRACT

An improved radio deployment tool (RDT) for determining cell boundaries is disclosed. An RDT used to carry-out active deployment procedures consists of an RDT wireless handset (RDTWH) that a deployment engineer uses to generate test signals, and an RDT base station (RDTBS) that is used to measure the RSSI of the test signals sent by the RDTWH. The RDTBS factors in the impact of short-term fades and dispersion, as well as long-term fading, by measuring and processing bit error rate (BER) and received signal strength intensity (RSSI) levels. BER levels can be measured for signals whose RSSI-levels have been driven into a testing range at which signals are susceptible to short-term fades and dispersion. A sufficient resolution of BER measurements is achieved by filling the payload fields of test packets exchanged by the RDTWH and RDTBS, with BER test data. The payload fields of the test packets can be filled by pressing down the mute button of the RDTWH.

34 Claims, 5 Drawing Sheets

RDTWH

RDTBS

———— points in path 3 from where test signals are generated

- - - - - - points in path 3 from where no test signals are generated

——————— points in path 3 from where test signals are being generated

— — — — — points in path 3 from where no test signals are being generated

METHOD FOR DETERMINING CELL BOUNDARY DURING BASE STATION DEPLOYMENT

FIELD OF THE INVENTION

This invention relates to a technique of deploying a personal communications system (PCS), and in particular, an improvement to a radio deployment tool (RDT) that assists in the placement of base stations in a communications coverage area.

BACKGROUND OF THE INVENTION

A personal communications system (PCS), like many other wireless communication systems, is organized around the cellular concept. The cellular concept involves dividing a customer-site, which is an area over which radio coverage is desired, into smaller areas called cells. Each cell contains a fixed base station near its centre that is networked with all the other base stations on the site. Each base station receives messages from and transmits messages to all handsets being used within its cell. The cellular concept also involves changing the base station that a handset relies upon to communicate with the network, as the handset is moved from one cell to another within the customer site, in a process referred to as a hand-off.

The efficient deployment of a system that is based on the cellular concept, involves providing radio coverage over all parts of a customer site at the lowest possible cost. This task, in turn, requires knowledge of the exact points in the customer site at which each cell's boundaries occur. A cell boundary occurs at the furthest points from a base station where signals to and from its base station are still of customer approved quality. The goal of deployment, is to set the cell-boundaries so that the minimum number of cells are planned for the area over which radio coverage is required, and so that all of the area is covered.

Note that the process of accurately ascertaining cell boundaries at the deployment stage is not to be confused with the process of efficiently effecting hand-offs in a live network. The hand-off process involves continually reselecting base stations in a noisy environment in order to maintain a communication channel as a wireless handset is moved by its user from one cell to another. Cell boundary determination involves determining the shape and location of a cell within which a handset can effectively communicate with a base station in a base station deployment. Accordingly, different sets of requirements, obstacles, and resources are associated with the two processes.

It is common in the industry to ascertain the location of cell boundaries by using intuitive or predictive techniques that are collectively classified as passive deployment procedures. Lucent Technologies' WISE tool embodies an example of such a procedure. These passive procedures, though often relatively cheap to conduct, often yield inadequate results for many reasons. One such reason is that the nature of wireless propagation is not well understood by many deployment engineers. Though radio signals may radiate from a base station uniformly in all directions, they can be attenuated by obstructions in their paths (for example, walls, metalwork, concrete, hills etc.) in a process referred to as long-term fading. Modelling long-term fading requires considerable skill, experience and a tremendous amount of site specific information; when not done by highly skilled engineers, or when not done without such information, installation errors result. Another reason why passive deployment procedures yield inadequate results is that even when they are carried out by a skilled deployment engineer, difficulties are often encountered because the radio opacities of many elements (e.g. floors, walls, ceilings) cannot be determined by visual inspection. In such cases, accurate modelling using passive techniques degenerates into a more speculative guessing technique.

The foregoing problems can be avoided using radio deployment tools (RDTs) that enable installers to carry out what are known in the art as active deployment procedures. Active deployment procedures, when considered in contradistinction to passive deployment techniques, involve determining cell-boundaries by analysing radio signals propagating from base stations. An RDT used to carry out active deployment procedures consists of a wireless handset that the deployment engineer uses to generate test signals and which will be referred to herein as a radio deployment tool wireless handset (RDTWH), and a base station that is used to measure the received signal strength intensity (RSSI) of the test signals sent by the RDTWH, and which will be referred to herein as a radio deployment tool base station (RDTBS).

One of the methods by which a deployment engineer uses an RDT to determine a cell boundary is as follows. The deployment engineer deploys an RDTBS in a location that provides coverage over an extremity of the site. The deployment engineer then walks radially away from the RDTBS in a fixed direction with an RDTWH in hand that continuously transmits a test signal back to the RDTBS. The RDTBS monitors the RSSI-level of the test signal to ensure it remains above some predetermined threshold value, $RSSI_0$. The deployment engineer keeps walking away from the RDTBS until the RSSI of the test signal falls below $RSSI_0$ at which point the RDTBS indicates to the RDTWH that a point on the cell boundary has been reached. When the RDTWH, in turn, notifies the deployment engineer of this occurrence through a noise, a message on its display or some other input/output (I/O) means, the deployment engineer notes his or her current location with respect to the RDTBS, and deems that location to be a boundary-point of the cell currently being measured.

It is to be noted that $RSSI_0$ is not set equal to the minimum power level at which communication between a handset and a base station is of an acceptable quality, this minimum power level being referred to hereinafter as $RSSI_{min}$. This is because a fading margin is required to allow for non-linear and unpredictable fading effects which may occur during the actual use of a handset in a non-deployment environment but which may not be detectable in a deployment environment. As such, $RSSI_0$ is set to equal $RSSI_{min}+M_f$, where $M_f$ is the required fading margin. In making provision for a fading margin, it is guaranteed that during actual use of a handset at any point in a cell, a degradation in the RSSI-level of up to $M_f$ dB due to non-linear and unpredictable fading may be tolerated without the RSSI-level dropping below $RSSI_{min}$.

It also is to be noted that in order for the continually moving deployment engineer to receive cell-boundary information in a timely manner, the time taken for (i) the RDTBS to determine that the RSSI is at the threshold value, (ii) the RDTBS to inform the RDTWH that a threshold has been reached, and (iii) the RDTWH to report this information to the deployment engineer, should ideally be less than one second.

The foregoing process is repeated until a plurality of boundary-points that collectively constitute a cell-boundary are defined.

When the deployment engineer has finished marking out a cell's boundary using the RSSI readings for the test signals displayed on the RDTWH, he or she then locates a new RDTBS in a cell adjacent to the cell whose boundary was just defined, such that it covers the points at which the RSSI-levels of the previous cell's RDTBS signals start to drop below an acceptable threshold. The process described above is then repeated for each new cell in succession, until coverage for the entire customer-site has been established.

Thus, by a series of such RSSI measurements, all the cell boundaries in a site can be accurately and quickly determined, and ultimately, an acceptable positioning of base stations can be achieved regardless of any sources of non-linear and unpredictable fading effects that are particular to a given customer-site.

Unfortunately, the performance of existing RDTs becomes inadequate when installing higher bit-rate PCS networks supporting protocols such as the Digital European Cordless Telecommunications (DECT) protocol. More specifically, existing RDTs are incapable of accounting for the effects of temporal dispersion and short-term fading, even though these effects need to be factored into the determination of cell boundaries when deploying high bit-rate PCS networks.

Temporal dispersion occurs when a symbol is transmitted through a time-dispersive medium such that the symbol is smeared by the time it arrives at the base station. Short-term fading occurs when a receiver receives many echoes of one transmitted signal at staggered intervals of time. Temporal dispersion and short-term fading need to be accounted for because they can cause bit-errors to occur in a non-deployment environment with a frequency which may make the signal quality unacceptable.

Prior-art RDTs are incapable of accounting for dispersion however, because dispersion affects signals by disrupting the timing of their propagation, not by causing an attenuation in signal power. Moreover, prior art RDTs also do not account for short-term fading because this effect causes RSSI-variations which are short in duration and which are typically averaged out over a longer period of time. This leaves prior art RDTs, which can only differentiate test signals by their RSSI-levels, and which do not attempt to control the RSSI-levels at which test-signals are received, with no way of delineating strong signals that are unaffected by dispersion and short-term fading from strong signals that are affected by dispersion and short-term fading.

This is an especially serious shortcoming, because there is no real way for the deployment engineer to account for these effects using passive deployment procedures. In the radio-static deployment environment, dispersion is highly dependent on the radio propagation medium, and with the exception of obviously reflective environments such as train stations with metal walls, the ability of the deployment engineer to ascertain which environments will be effected by high-levels of dispersion and short-term fading without a tool that can actively measure these effects, is impractical.

This failure of prior art RDTs to account for dispersion and short-term fading means that they can incorrectly indicate to the deployment engineer that no cell boundary should be defined even at a point in the site where there is an inadequate fading margin.

Some packet-based communication protocols, such as the Digital European Cordless Telecommunications (DECT) protocol for example, have packet formats that include both cyclic redundancy check (CRC) fields and check sum (CS) fields. These fields are used to perform an integrity check on the various sub-fields of the entire packet, and are only capable of indicating whether or not a packet is error-free. It is impossible to obtain high-resolution bit error rate (BER) measurements using the CRC or CS fields. This is largely because, even in high bit-rate protocols such as the Digital European Cordless Telecommunications (DECT) protocol, a packet can only be sent by the RDTWH to the RDTBS once every 10 ms, and because the CRC and CS fields only indicate that either no bit errors have occurred, or one or more bit errors have occurred. This means that any BER-levels determined using CRC or CS fields can only be accurate to approximately 1%. This is a substantially inferior resolution to the BER resolution of 0.1%, which is the BER-level below which errors in a signal are imperceivable to the typical PCS user.

SUMMARY OF THE INVENTION

It thus is an object of this invention to provide an improved radio deployment tool (RDT) that can factor in the impact of short-term fading, dispersion, as well as long-term fading, in accurately reporting whether or not a deployment engineer is within a cell boundary.

The RDT achieves these objects by measuring and processing bit error rate (BER) levels, in addition to the RSSI-levels measured by prior art RDTs. BER-levels are measured, because they are functions of both RSSI-levels and the short-term fading and dispersion effects described above. This means that BER-levels of received signals can be analysed, in conjunction with the RSSI-levels of the signals, to deduce whether or not short-term fading or dispersion effects are adversely impacting fading margin.

More specifically, in one aspect of this invention, these and other objects are achieved by a method of obtaining, for base station deployment purposes, a determination of whether a wireless handset at a given location is inside or outside a cell boundary of a base station, said method comprising the steps of: the wireless handset transmitting a test signal from the location, said signal carrying a transmitted test sequence of bits; the base station receiving from the wireless handset a received signal carrying a received sequence of bits; the base station measuring a received signal strength intensity (RSSI) level for the received signal; the base station measuring a high resolution bit error rate (BER) level for the received sequence, with reference to the transmitted test sequence; the base station making the determination on the basis of whether or not the measured RSSI-levels exceed an RSSI threshold, and whether or not the BER-level exceeds a BER threshold; the base station indicating the determination.

The above-mentioned objects are also achieved, in another aspect of this invention by a radio deployment tool (RDT)comprising: a wireless handset for transmitting a test signal containing a transmitted test sequence to the base station; and a base station comprising means for receiving a received signal, an RSSI detector for measuring the received signal strength intensity (RSSI) level of the received signal, a processor for calculating a bit error rate (BER) of a received sequence carried by the received signal and for comparing both the RSSI and the BER-levels to RSSI and BER thresholds, respectively, in making a determination of whether the wireless handset is inside or outside the cell boundary of the base station, and an indicating device for communicating the determination to a user.

BRIEF DESCRIPTION OF THE DRAWINGS

Embodiments of the invention will now be described with reference to the accompanying drawings, in which:

FIG. 3 is an illustration of the data structure primarily relied upon by the RDTBS of FIG. 2a; and FIG. 4 is a plot of RSSI-levels illustrating a bit error rate (BER) test used by the RDT of FIG. 2a.

DETAILED DESCRIPTION OF THE PREFERRED EMBODIMENTS

Figure 1:
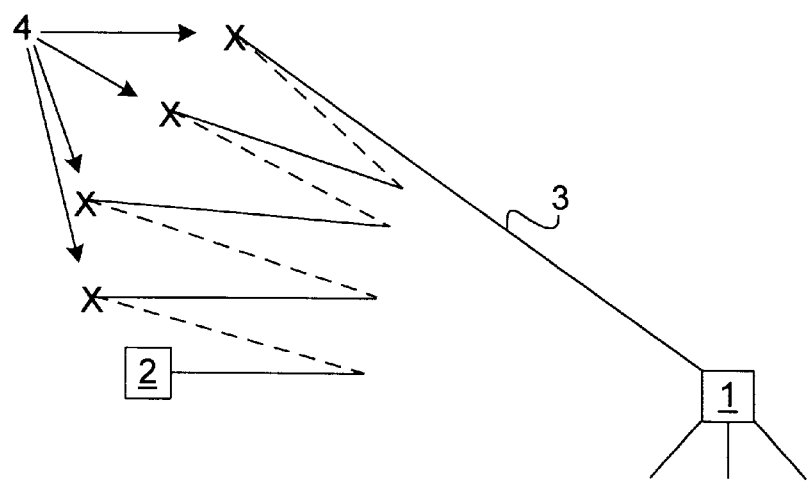
FIG. 1 is an illustration of a conventional method by which a conventional radio-deployment tool (RDT) can be used to determine cell boundaries.

Referring first to FIG. 1, a conventional method will be described by which a deployment engineer can use a conventional radio-deployment tool (RDT) to determine the boundaries of a cell, for use in lower bit-rate applications unaffected by short-term fades and dispersion. FIG. 1 contains an RDT base station (RDTBS) 1, and an RDT wireless handset (RDTWH) 2 which could be carried by a deployment engineer (not shown).

The RDT, which comprises the RDTBS 1 and the RDTWH 2, operates when test signals are periodically sent from the RDTWH 2 to the RDTBS 1 while the RDTWH is held by a deployment engineer following a path, such as a path 3 for example. Test signals are generated only as the deployment engineer walks the RDTWH 2 away from the RDTBS 1. The test signals are analysed on the RDTBS 1, so that it can indicate to the deployment engineer, through the user-interface of the RDTWH 2, whether or not he or she has reached a cell boundary. The analysis performed on the test signals by such a conventional RDTBS 1 comprises the steps of measuring RSSI-levels of the test signals, determining points 4 where the RSSI-levels of the test signals fall below some threshold value, $RSSI_0$, and then using these points 4 to define a cell-boundary. As discussed previously however, this conventional method is inadequate when applied to the newly-emerging high bit-rate PCS (personal communication services) systems because of its inability to account for short-term fading and temporal dispersion.

According to an embodiment of the invention, an RDT is provided which can determine cell-boundary points for the newly-emerging high bit-rate PCS systems by considering, in addition to the RSSI-levels of test signals with respect to $RSSI_0$, the bit error rates (BER) of test signals. BER-levels are measured, because they are functions of both RSSI-levels, and the short-term fading and dispersion effects described above. BER-levels of received signals are thus analysed, in conjunction with the RSSI-levels of those same signals, to deduce whether or not short-term fading or dispersion effects are adversely impacting signals at a given point in the site.

It is to be noted that in a preferred embodiment of this invention, the RDT measures BER-levels only for signals whose RSSI-levels it forces down into a testing range, $[RSSI_0 \ldots RSSI_{min}]$, where $RSSI_{min}$ is the minimum power level at which communication between a handset and a receiver is of an acceptable quality. BER-levels are only measured for signals that have been driven into the testing range because signals falling outside it are either too strong ($RSSI > RSSI_0$) to be adversely affected by short-term fading and dispersion or too weak ($RSSI < RSSI_{min}$) to be considered for acceptance by the network in the first place. Signals falling inside the testing range on the other hand, are both susceptible to these same effects and occasionally of value to the network.

More specifically, signals falling inside the testing range are of value when they also form part of a fading range that is maintained in order to allow the network to tolerate signals afflicted by a pre-defined range of non-linear and unpredictable fades. The fading range at a given point extends from $[RSSI_{meas} \ldots RSSI_{meas} - M_f]$, where $RSSI_{meas}$ is the average RSSI-level with which signals are received from that point during deployment, and $M_f$ is a fading margin that must be maintained below $RSSI_{meas}$ at all points in a cell. The fading range begins to be adversely impacted by short-term fades and dispersion as it starts to overlap with the testing range. Therefore, BER testing is performed on signals whose RSSI-levels have been forced down into the testing range, in order to simulate the operation of the fading margin over a range of RSSI-levels at which it is vulnerable against short-term fading or dispersion.

Figure 2A:
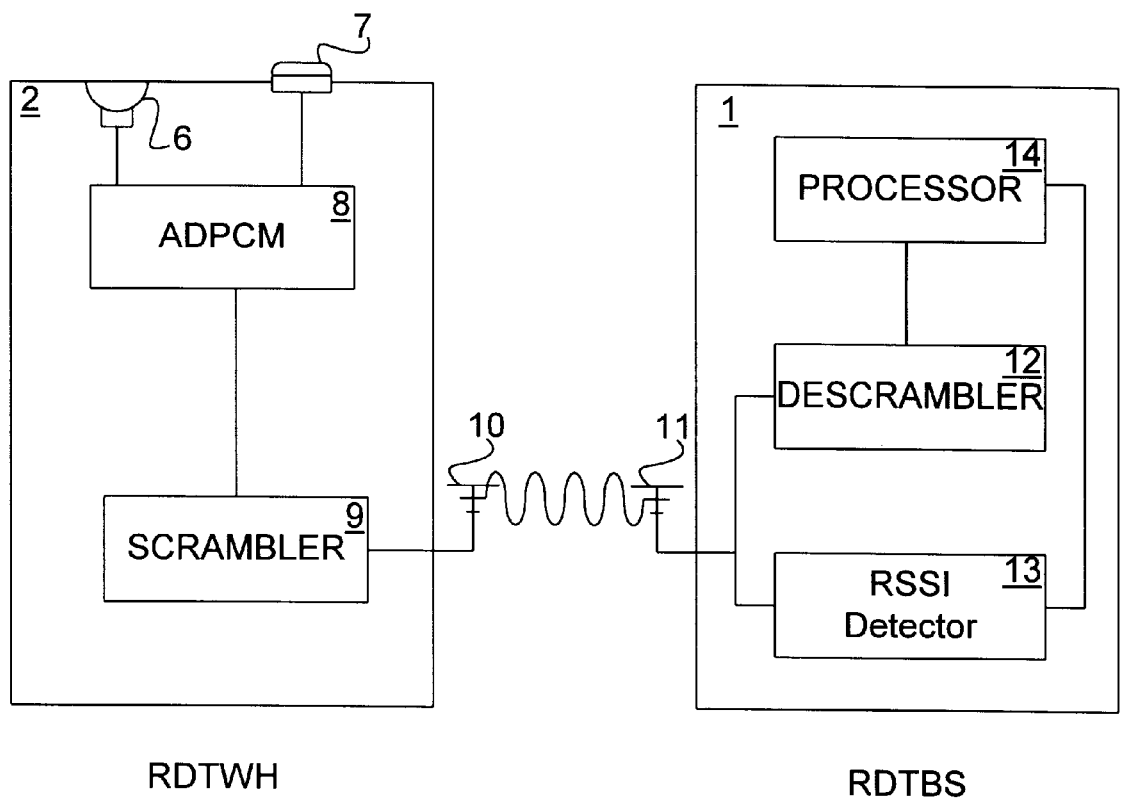
FIG. 2a is a block diagram of an RDT according to an embodiment of the invention, including a radio deployment tool wireless handset (RDTWH) and a radio deployment tool base station (RDTBS)

Referring now to FIG. 2a, an RDT according to an embodiment of the invention, again has an RDTBS 1 and an RDTWH 2. The RDTWH may be a conventional wireless handset or may contain modifications to enhance RDT functionality. The RDTBS may be an otherwise conventional base station enhanced with the required RDT capabilities as discussed in detail below. The RDTWH 2 contains a microphone 6 for converting audio signals from the user into electrical signals, and a mute button 7 that the user can press to prevent the digitization and transmission of any electrical signal emanating from the microphone 6. Both the microphone 6 and the mute button 7 are connected to an adaptive pulse code modulation (ADPCM) digital signal processor (DSP) 8, such that ADPCM modulation is performed on digitized signals received from the microphone 6 when the mute button 7 is not depressed, and on a string of 0-bytes when the mute button 7 is being held down. In some RDTWHs, the mute button 7 may also function in a toggle mode wherein alternate strokes of the button 7 initiate and disable the mute feature. For the purposes of this embodiment, the mute feature must be activated during testing, and in what follows, this is assumed to be the case. The ADPCM DSP 8 is connected to a scrambler circuit 9. The scrambler 9 combines the bit-stream output of the ADPCM DSP 8 with a known sequence of bits in order to produce a scrambled sequence of bits which is unlikely to contain continuous strings of 0-bits or 1-bits, and which is therefore more easily modulated and transmitted. The scrambler 9 is connected to an antenna and associated circuitry 10, which is responsible for inserting the scrambled bit stream into packets, placing the packets into communications signals, and transmitting the communications signals through the air to the RDTBS 1.

The RDTBS 1 contains an antenna and associated circuitry 11 which is capable of applying a known attenuation to the RSSI-level of the received signals so the attenuated RSSI-level falls into the testing range, $[RSSI_0 \ldots RSSI_{min}]$. The generation of such signals, hereinafter RDT attenuated signals, is achieved by having the RDTBS 2 use different receiver configuration settings by, for example, adjusting the receive-sensitivity control of the RDTBS 2, varying the location of attenuation pads on the RDTBS 2, and/or varying the antennas 11 used to detect the received signals.

The resulting RDT-attenuated signals are sent to an RSSI detector 13 that measures RSSI-levels and passes the results to a processor 14. The antenna and associated circuitry 11 also extract packets from the received signals from the RDTWH 2, and passes them to a descrambler 12 that is matched to the scrambler 9 on the RDTWH 1. The output of the descrambler 12, which is the received version of the digitized output generated by the ADPCM 8 on the RDTWH 2, is also sent to the processor 14 where BER calculation takes place. Since the descrambled contents of the packets should be entirely comprised of zero bits in the absence of any error, the processor 14 may determine the BER by, for example, making the following calculation:

$$BER = \frac{\text{\# of non-zero descrambled bits received during test-interval}}{\text{\# of bits received during test-interval}}$$

BER-levels must be calculated to a threshold accuracy of 0.1%, said threshold hereinafter referred to as $BER_0$. $BER_0$ is the highest BER-level at which bit errors are accepted as being imperceivable to the human ear.

A large number of BER tests are required to calculate a BER to an accuracy of the order of $BER_0$. For $BER_0$ of 0.1%, at least 1000 bits per second are required per BER measurement. A large number of BER tests are also needed to reduce the inaccuracies introduced by random fades, which are generally small and temporal in nature, and which are not to be confused with either the short-term or long-term fades that have been previously described, which are persistent in nature. This high resolution is preferably achieved by filling the entire payload field of the packets sent by the RDTWH with BER test data, as done in the RDTWH 2 illustrated in FIG. 2a.

For example, consider a preferred embodiment wherein the communication protocol shared by the RDTBS and RDTWH is the Digital European Cordless Telecommunications (DECT) protocol. With DECT, 320 bits of data are transmitted in the payload field (the B-field) of a packet, every 10 ms. Thus, under this embodiment, each packet's payload field is populated with a scrambled version of 320 zero-bits every 10 ms. A total of 32,000 bits per second are available for BER testing. Since, as indicated above, 1000 bits per second are required per BER measurement, this provides an adequate capacity to support BER testing at up to 32 different RSSI-levels. More specifically, given that 320 bits of test data are received every 10 ms, and assuming that the RDT is receiving test data from signals that are each transmitted at one of 32 different RSSI-levels, 320 bits of BER test data are received per RSSI-level per 320 ms test period. This may be extrapolated to conclude that an average 1000 bits of BER test data are received per RSSI_level per second. If test data from different test periods are combined to yield averaged BER results over periods of time at least a second in duration, as contemplated below, the use of the DECT payload thus provides 1000 bits for BER testing per second for each RSSI-level, or equivalently, a BER resolution of 0.1%.

Figure 2B:
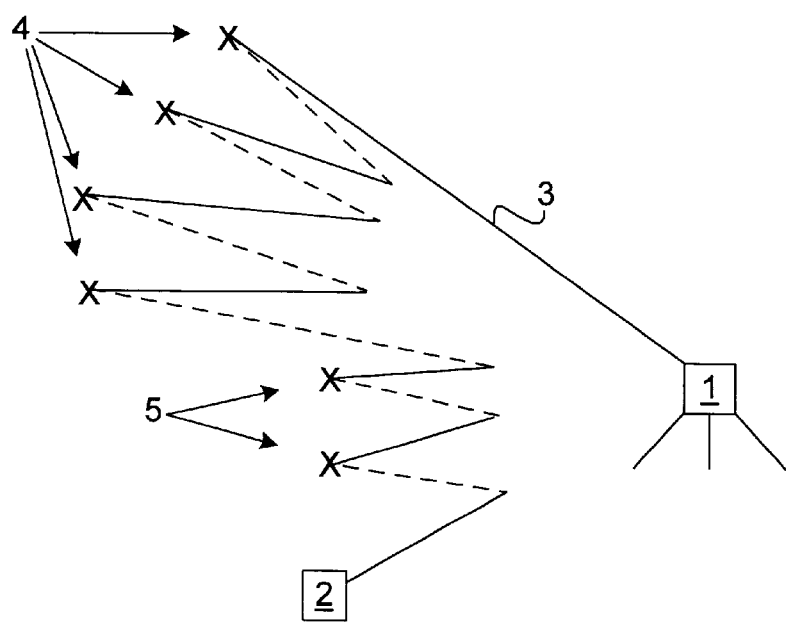
FIG. 2b is an illustration of how the RDT of FIG. 2a is used to determine cell boundaries.

An example of the operation of the embodiment illustrated in FIG. 2a is illustrated in FIG. 2b. As in the conventional method illustrated in FIG. 1, the RDT operates when test signals are periodically sent from the RDTWH 2 to the RDTBS 1 which held by a deployment engineer following a path such as a path 3. Test signals are preferably generated only as the deployment engineer walks the RDTWH 2 away from the RDTBS 1. Also as in the conventional method illustrated in FIG. 1, the test signals are analysed such that the RDTBS 1 can indicate to the deployment engineer whether or not he or she has reached a cell boundary. Unlike the method illustrated in FIG. 1 however, the deployment engineer holds down the mute button 7 of the RDTWH 2 to generate a test signal. When the mute button 7 is held down, the ADPCM module 8 automatically generates a digitized ADPCM-encoded stream of 0-bits, regardless of what sounds can be detected by the microphone 6. The scrambler 9 will combine the zero-bits with known pseudo-random sequences. The scrambler then places the scrambled combination into the payload of a test packet, which is placed within the test signal. Using the mute button 7 to generate test packets for BER testing allows the deployment engineer to populate the entire payload field of test packets with clean, known and consistent pseudo-random sequences using only a conventional wireless handset (the RDTWH). The test signal is transmitted through the air to the RDTBS 2 via the transmit antenna 6.

Once received at the RDTBS 1 via the antenna and associated circuitry 11, the RSSI-level of the signal is attenuated to a level falling within the testing range, $[RSSI_0 \ldots RSSI_{min}]$. The RSSI detector 13 measures the RSSI-level of the RDT-attenuated signal. The measured RSSI-level is reported to the processor 14, which uses the information to help determine whether or not a cell boundary has been reached by the deployment engineer.

At the same time, the data in the payload field of the received packet contained within the received signal is extracted and descrambled by the descrambler 12, which is aware of the scrambling sequence used by the scrambler 9. Assuming the mute button 7 was activated by the deployment engineer at transmission time, a correctly descrambled packet would yield a stream of zero-bits. Any non-zero bits emerging from the descrambler 12 would indicate an error during transmission, which could be attributable to long-term fading, or dispersion and short-term fading. The processor 14 counts the non-zero bits and calculates a BER-level for the test signal.

The processor 14 then uses RSSI and BER measurements to help the deployment engineer determine whether or not he or she has reached a cell boundary. Boundary points can be deemed present at points 4 where the RSSI test is failed, or at points 5 where the RSSI test is passed but the BER test is failed.

The processor 14 may use the RSSI and BER measurements to determine the cell boundary in a number of ways. In a preferred embodiment, BER-testing and RSSI-testing do not take place on a per-signal basis. Instead, each BER and RSSI test is carried out using a plurality of signals that are sequentially transmitted from the RDTWH 2 to the RDTBS 1 within a testing-period of less than one second. This allows for statistical manipulation of the test results in order to compensate for spurious signals which if analysed in isolation may cause the RDT to incorrectly determine cell-boundary points. It also allows for the combining of BER test results from several test signals so as to improve the BER resolution of the RDT.

More specifically, the RDT measures BER-levels for a series of signals received at selected RSSI-levels evenly spaced within the range $[RSSI_0 \ldots RSSI_{min}]$. For example, if the DECT protocol is assumed wherein the fading margin extends 32 dB above $RSSI_{min}$, then 32 test-signals would be generated each test-period. The signals would be attenuated so their RSSI-levels equal $\{RSSI_{min}+1 \text{ dB}, RSSI_{min}+2 \text{ dB}, \ldots, RSSI_{min}+32 \text{ dB}\}$.

Figure 3:
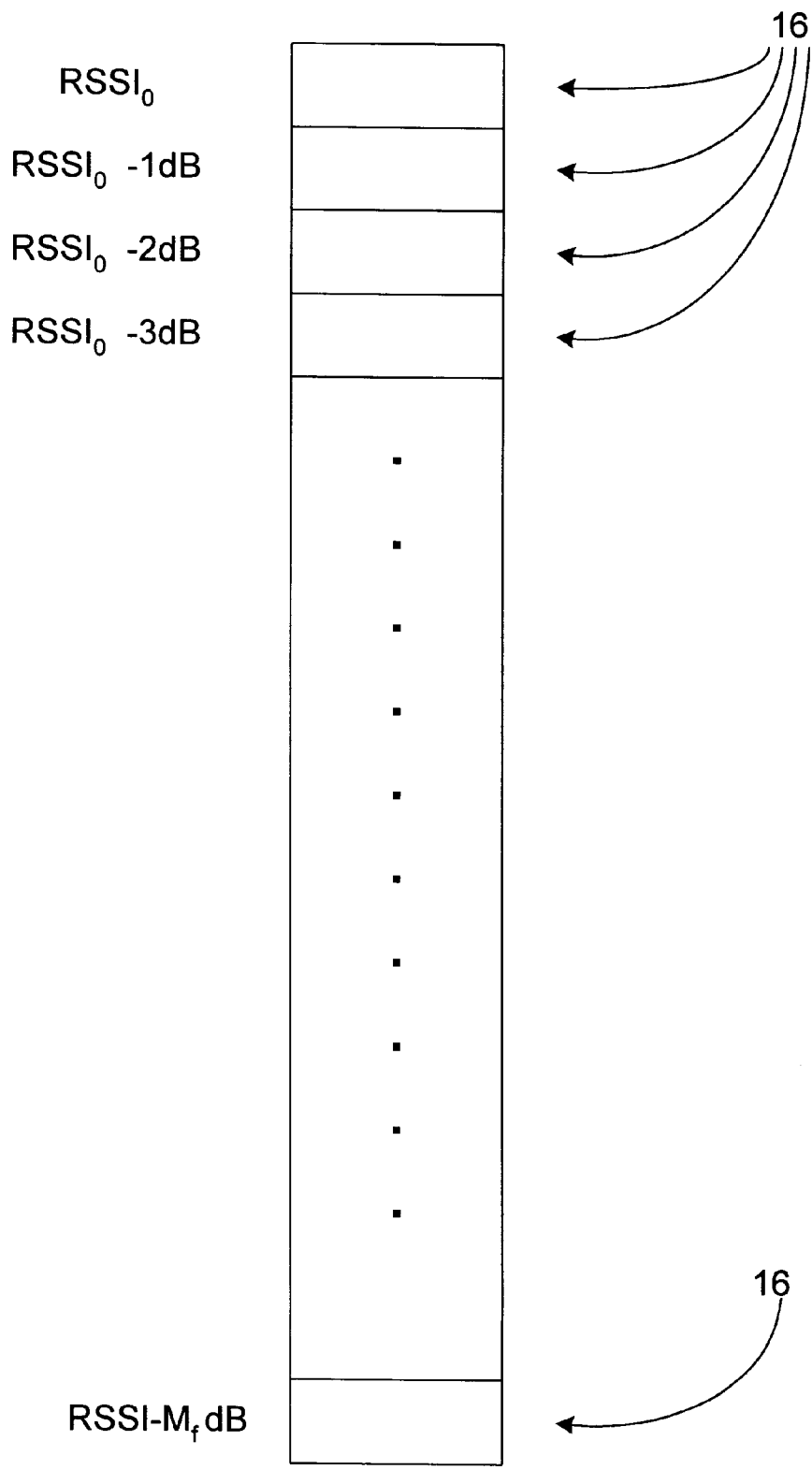

The measured BER-levels of each of the 32 RDT-attenuated test signals are held in a BER_ERRORS array, which is illustrated in FIG. 3. The BER_ERRORS array 15 has 32 elements 16 that each contain an average BER-level for packets received at a respective one of the 32 RDT-attenuated RSSI-levels. The elements are indexed according to the RSSI-levels at which the associated BER tests were conducted, which ranges from $[RSSI_0 \ldots RSSI_{min}]$ as mentioned previously.

The RDTBS updates one element in the array 15 every time a packet arrives from the RDTWH 2. As indicated previously, a single packet may contain spurious data which should not be analysed in isolation. As such, BER-levels obtained from a packet received at one of the 32 RDT-attenuated RSSI-levels, must be combined with previous measurements taken at the same RSSI-level. In a preferred embodiment, this is done using an exponentially weighted moving average (EWMA) which generally has the following form:

$$\text{average\_}x_t = c_1 \times \text{new\_}x + c_2 \times \text{average\_}x_{t-1}.$$

In the above, average_$x_{t-1}$ is the previously computed average value, new_x is the newly measured value and average_$x_t$ is the newly computed average value. $c_1$ and $c_2$ are EWMA parameters which determine the relative weight given to the new data versus the previous data. For the BER computation case, the nth element in the BER_ERRORS array 15 is updated according to the following equation:

$$\text{BER\_ERRORS}[n]_t = \text{BER}_{count} \times c_1 + \text{BER\_ERRORS}[n]_{t-1} \times c_2$$

$\text{BER}_{count}$ is the BER-level measured for the nth RDT-attenuated signal during the current testing-period. BER_ERRORS[n]$_{t-1}$ is the average BER-level entry to the BER_ERRORS array 15 made for the previous test period. In a preferred embodiment, $c_1$ and $c_2$ are chosen such that a significant exponential lag is implemented to minimise the effect of spurious BER measurements on the BER-levels entered into BER_ERRORS 15. It is to be noted that besides negating the impact of spurious BER measurements, this combining of results also means that values in the BER_ERRORS array 15 can represent an average number of erroneous bits per test packet received over multiple test-periods. This allows for the recording of BER-levels with a resolution that exceeds the 1/320 resolution that is possible if test data from each individual packet is analysed in isolation.

Besides an update of BER_ERRORS 15, an average RSSI-level for the entire test-period is incrementally developed as more test-signals arrive. More specifically, when the nth test-signal arrives within a test period, the average RSSI-level is updated using an EWMA according to the following equation:

$$\text{average\_}RSSI(n) = (RSSI_n + A(n)) \times c_1 + \text{average\_}RSSI(n-1) \times c_2$$

$RSSI_n$ is the RSSI-level measured for the nth RDT-attenuated signal processed by the RSSI detector 13 during the current testing-period. A(n) is the effect of the attenuation setting imposed by the RDT upon the nth test signal, which is added back on to $RSSI_n$ in order to estimate the RSSI-level that would have been measured if no RDT-attenuation had been imposed. The variable, average_RSSI (n−1), is the estimate of an average RSSI-level calculated after the previous test signal had arrived. $c_1$ and $c_2$ are EWMA weighting parameters. In a preferred embodiment, $c_1$ and $c_2$ are chosen such that a significant exponential lag is implemented to minimise the effect of spurious RSSI measurements on the RSSI-level calculated for the test-period.

At the end of every test period (in this example, every 320 ms), the average RSSI-level calculated using the last test signal of the period (in this example, RSSI(32)) will be defined as the $RSSI_{meas}$ value for the present location of the deployment engineer.

Once $RSSI_{meas}$ is determined, it is compared to $RSSI_0$. If it is less than $RSSI_0$, the RSSI test is failed from the point at which the deployment engineer is presently located, and there is no need to process the gathered BER data. The deployment engineer will be informed that he or she is located at a point on the cell boundary.

Figure 4:
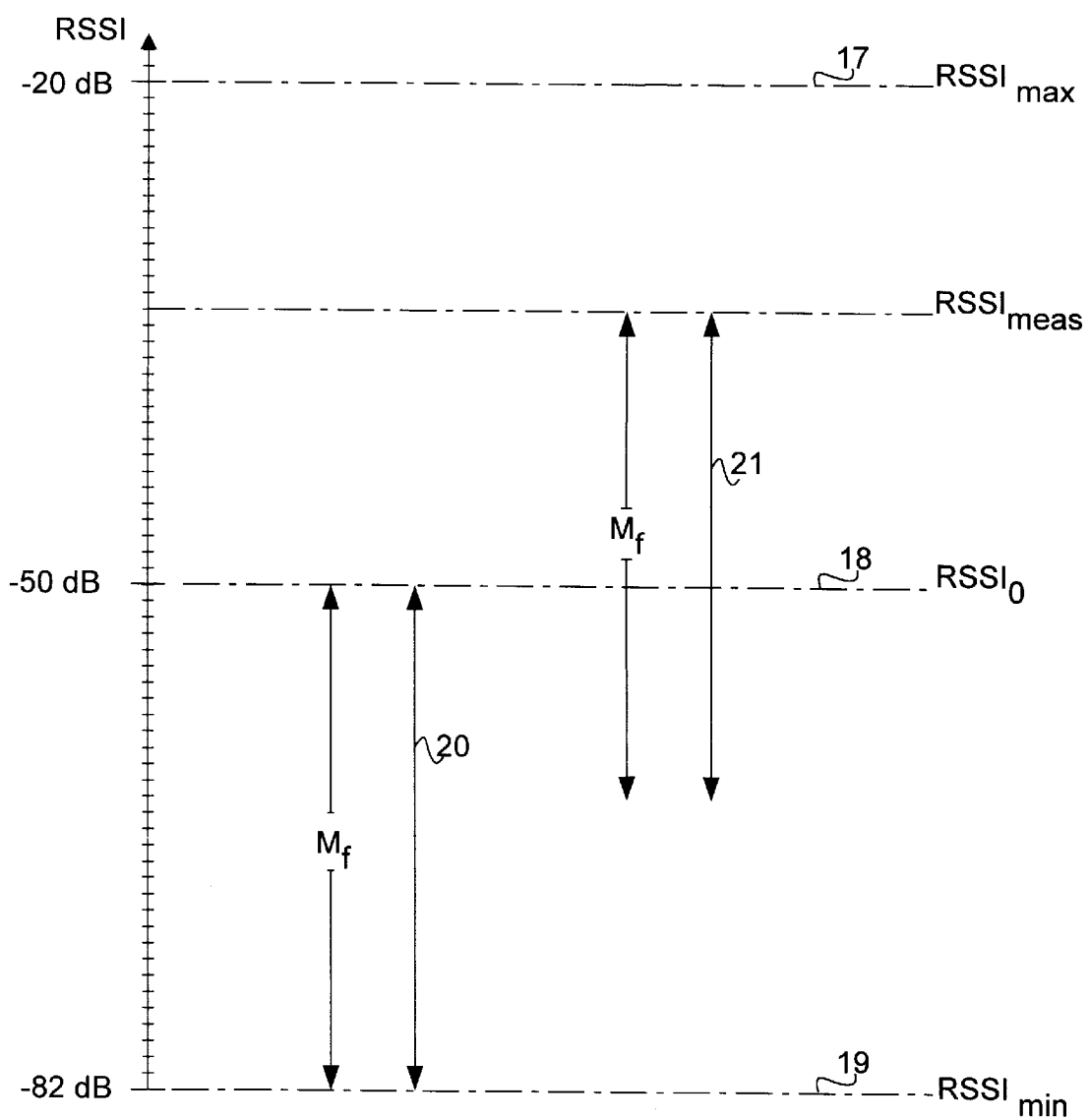

If $RSSI_{meas}$ is greater than $RSSI_0$, the accumulated BER-level measurements in BER_ERRORS 15 are processed to complete the BER test. Completing the BER test involves sequentially examining the contents of the elements of the BER_ERRORS array 15, to determine whether or not communication channels with BER<$BER_0$ are available across the entire required fading range for the present location of the deployment engineer. This object can be achieved using the following algorithm, which is described with reference to FIG. 4. FIG. 4 illustrates a plot of various RSSI-levels. It shows a maximum expected RSSI-level for signals arriving from a handset, $RSSI_{max}$ 17, $RSSI_0$ 18 and $RSSI_{min}$ 19. FIG. 4 also illustrates the RSSI-levels in the testing range, [$RSSI_0$ . . . $RSSI_{min}$] 20, at which the BER-levels were just measured. Finally, FIG. 4 illustrates the fading range 21 for a given test period, which extends $M_f$ decibels downward from $RSSI_{meas}$, and which can only be defined once $RSSI_{meas}$ has been determined.

The BER test is completed by determining whether or not inadequate BER-levels are measured at RSSI-levels that fall within the required fading range [$RSSI_{meas}$ . . . $RSSI_{meas}$−$M_f$] 21. If the BER-levels of fading range signals are inadequate (i.e. if BER>$BER_0$), the required fading margin 21 is deemed to be unavailable at the present location of the deployment engineer and the BER test is failed.

Since unacceptable BER-levels are assumed to occur only within the testing range, [$RSSI_0$ . . . $RSSI_{min}$] 20, the foregoing test can be achieved by seeing if unacceptable BER-levels have been recorded for parts of the testing range 20 that overlap with the fading range 21. This in turn, can be done according to the following procedure:

1. The readings in all the corresponding BER_ERRORS elements are compared to the threshold, $BER_0$. If there are no elements with BER values>$BER_0$, then there are no noticeable short-term fading or dispersion effects within the testing range [$RSSI_0$ . . . $RSSI_{min}$] 20, and therefore no such effects within the fading range 21. The BER test is passed and there is no need to proceed to the next step.

2. If there are elements in BER_ERRORS 15 with BER values>$BER_0$, the highest RDT-attenuated RSSI-level signal at which the BER-level rises above 0.1%, $RSSI_{fail}$, is isolated. The size of the required fading margin, $M_f$, is added to $RSSI_{fail}$. If the resulting sum exceeds $RSSI_{meas}$, $RSSI_{fail}$ must fall within the fading margin 21 and the BER test is therefore failed. Otherwise, BER-levels are deemed to become unacceptable only at RSSI-levels falling below the fading margin, and the BER test is thus passed.

If either the BER test or the RSSI test is failed, the deployment engineer is alerted to the fact that a point on the cell boundary has been found, regardless of whether or not the average RSSI-level, $RSSI_{meas}$, exceeds $RSSI_0$. In this way, $RSSI_{meas}$ is maintained high enough not only for it to exceed $RSSI_0$, but also for all RSSI-levels within its fading margin to exceed any RSSI-levels at which dispersion and short-term fading effects are noticeable.

If neither the BER test nor the RSSI test has failed, the deployment engineer is informed that the RDTWH is deemed to be inside the cell boundary.

In the above-described embodiment, this procedure is repeated each 320 ms, using freshly updated elements of the BER_ERRORS testing array 15 and a freshly updated average RSSI-level.

At the end of every testing period, once the RDT has decided whether or not a cell boundary point has been located on the basis of the most recent RSSI and BER tests, it can directly communicate those determinations using well known man-machine I/O (MMI) devices such as sound or light sources, or it can communicate those same determinations to the RDTWH 2 which would then communicate them to the deployment engineer through an MMI. Those skilled in the art will appreciate that the transmitter of a standard base station and the receiver and display of a standard wireless handset could be used without further alteration to implement an acceptable MMI for an RDT.

A discrete alert may be signalled to the deployment engineer as the cell boundary point is encountered. This would occur when the BER/RSSI tests undergo a transition from pass to fail. Alternatively, an alert may be signalled after each test that indicates whether the RDTWH is located inside or outside a cell boundary.

Numerous modifications and variations of the present invention are possible in light of the above teachings. It is therefore to be understood that within the scope of the appended claims, the invention may be practised otherwise than as specifically described herein. For example, the RDT can be operated over protocols other than DECT. Methods of generating known pseudo-random sequences of bits for BER testing, other than holding down the mute button 7 on the RDTWH 2, can also be used.

In other variants, a cell-boundary may be defined by manipulating the measured BER and RSSI-levels according to different algorithms. The size of the testing periods and test-packets can be varied. Moreover, filtering functions other than EWMA functions can be employed to statistically manipulate RSSI and BER measurements. The weights used by such functions can also be varied.

In another variant, the size of the fading margin can be reduced by decreasing the power at which the RDTWH operates, such that the lowest RSSI-level that is detectable by the RDTBS increases. As long as reducing the size of the fading margin is acceptable to network users, such variants would be preferred embodiments as they would allow for a greater number of BER tests to be conducted per second. For example, if the DECT RDTWH has a minimum sensitivity level at only 16 dB below $RSSI_0$ as opposed to 32 dB below $RSSI_0$, the fading margin could be reduced to 16 dB, the testing range can also be reduced so it extends over 16 dB, and only 16 test signals would be required per BER test period. This in turn means that twice as many BER tests could be carried out per unit of time, and an increased BER resolution of 0.05% can be achieved that would span $BER_0$.

Similarly, a greater number of tests per unit time, and therefore a greater BER resolution, can be achieved by driving RDT-attenuated signals into more widely spaced RSSI-levels within the testing range. Calculating BER-levels for signals at 2 dB intervals for example, would also double the number of possible tests per unit time.

The user-interface by which the RDT communicates with a deployment engineer, can also be varied in a number of ways, including having the display on the RDTWH 2 continuously display RSSI and BER-levels, and having the RDTBS 1 communicate directly with the deployment engineer using a variety of MMI devices.

Furthermore, audible alerting devices or ringers on the RDTWH 2 can be used as MMIs. These devices can draw on one of the several forms of distinctive ringing sounds supported by most standard wireless communication protocols for non-deployment environment features such as "ring-again." Since such features need not be supported in the deployment environment, each associated ringing sound can be designated to represent a different message from the RDT. For example, when a cell boundary has been determined, one form of ringing can be used to attribute the determination to a failed BER test, while another form of ringing can be used to attribute the determination to a failed RSSI test. In another example, another form of ringing could indicate when the mute button 7 is not operational because it has not been toggled.

We claim:

1. A method of obtaining, for base station deployment purposes, a determination of whether a wireless handset at a location is inside or outside a cell boundary of a base station, said method comprising the steps of:

(a) the wireless handset transmitting a test signal from the location, said signal carrying a transmitted test sequence of bits;

(b) the base station receiving from the wireless handset a received signal carrying a received sequence of bits;

(c) the base station measuring a received signal strength intensity (RSSI) level for the received signal;

(d) the base station measuring a high resolution bit error rate (BER) level for the received sequence, with reference to the transmitted test sequence;

(e) the base station making the determination that the handset is outside the cell boundary if the measured RSSI-level is less than an RSSI threshold;

(f) the base station making the determination that the handset is outside the cell boundary if the BER-level exceeds a BER threshold; and (g) the base station indicating the determination.

2. The method of claim 1 wherein the step of indicating the determination comprises the step of indicating the determination only as the determination is undergoing a transition from indicating the location is inside to indicating the location is outside, such that the method can be used to define whether or not the location is at a cell boundary point of the base station.

3. The method of claim 2, wherein steps (a) through (f) are repeated as a user of the RDT holding the wireless handset repeatedly walks radially away from the base station in a plurality of fixed directions, so as to determine a plurality of cell boundary points that can be collectively used to define a cell boundary for the base station.

4. The method of claim 1 wherein the step of the wireless handset transmitting each test signal further comprises the step of inserting the test sequence into a payload field of a test packet, and wherein the step of the base station measuring a high resolution bit error rate (BER) further comprises the steps of extracting a received packet from the received signal, and extracting from the payload field of the received packet the received sequence.

5. The method of claim 1 wherein the BER threshold is equal to 0.1%.

6. The method of claim 1 wherein the step of indicating the determination comprises the step of the base station directly communicating the determination to a user.

7. The method of claim 1 wherein the step of indicating the determination comprises the steps of the base station communicating the determination to the wireless handset, and the wireless handset communicating the determination to a user.

8. The method of claim 7 wherein the step of the wireless handset communicating the determination to a user includes the step of using a plurality of types of ringing sounds, each type of ringing sound being designated to represent a different message.

9. The method of claim 7 wherein the step of the wireless handset communicating the determination to a user includes the step of placing the determination on the display of the wireless handset.

10. The method of claim 9 wherein the step of placing the determination on the display of the wireless handset includes the step of continuously displaying measured RSSI and BER levels.

11. The method of claim 1 wherein all the steps are completed within a period of time that is not substantially greater than one second.

12. A method according to claim 1 wherein the BER is determined by making bit-by-bit comparison of the received sequence with the transmitted test sequence.

13. A method according to claim 1 further comprising attenuating the received signal to simulate a fade before making the BER measurement.

14. A method of obtaining, for base station deployment purposes, a determination of whether a wireless handset at a location is inside or outside a cell boundary of a base station, said method comprising the steps of:

(a) the wireless handset transmitting a test signal from the location, said signal carrying a transmitted test sequence of bits;

(b) the base station receiving from the wireless handset a received signal carrying a received sequence of bits;

(c) the base station measuring a received signal strength intensity (RSSI) level for the received signal;

(d) the base station measuring a high resolution bit error rate (BER) level for the received sequence, with reference to the transmitted test sequence;

(e) the base station making the determination that the handset is outside the cell boundary if the measured RSSI-level is less than an RSSI threshold;

(f) the base station making the determination that the handset is outside the cell boundary if the BER-level exceeds a BER threshold; and (g) the base station indicating the determination;

wherein the step of the wireless handset transmitting the test signal further comprises the step of scrambling a known test sequence of bits to produce the transmitted test sequence, and wherein the step of the base station measuring a high resolution bit error rate (BER) further comprises the step of extracting a scrambled received sequence of bits from the received signal, and descrambling the scrambled received sequence to produce the received sequence.

15. A method of obtaining, for base station deployment purposes, a determination of whether a wireless handset at a location is inside or outside a cell boundary of a base station, said method comprising the steps of:

(a) the wireless handset transmitting a test signal from the location, said signal carrying a transmitted test sequence of bits;

(b) the base station receiving from the wireless handset a received signal carrying a received sequence of bits;

(c) the base station measuring a received signal strength intensity (RSSI) level for the received signal;

(d) the base station measuring a high resolution bit error rate (BER) level for the received sequence, with reference to the transmitted test sequence;

(e) the base station making the determination that the handset is outside the cell boundary if the measured RSSI-level is less than an RSSI threshold;

(f) the base station making the determination that the handset is outside the cell boundary if the BER-level exceeds a BER threshold; and (g) the base station indicating the determination;

wherein the step of the wireless handset transmitting a test signal includes the step of a user activating the mute feature of the wireless handset thereby resulting in the transmitted test sequence being entirely comprised of zero-bits, and wherein the step of the base station measuring a high resolution BER-level includes the step of counting the number of non-zero bits in the received sequence.

16. A method of obtaining, for base station deployment purposes, a determination of whether a wireless handset at a location is inside or outside a cell boundary of a base station, said method comprising the steps of:

the wireless handset transmitting a plurality of test signals from the location, each signal containing a respective transmitted sequence;

the base station receiving through a receive path a plurality of received signals, each containing a respective received sequence;

the base station inserting a selectable, known and varying attenuation in the receive path, to generate RDT-attenuated signals;

the base station estimating an average RSSI-level of the received signals not including the attenuation;

the base station calculating a high resolution bit error rate (BER) level of each RDT-attenuated signal, with reference to its respective transmitted sequence;

the base station making the determination on the basis of the average RSSI-level and the calculated BER-levels; and the base station indicating the determination.

17. The method of claim 16 wherein the step of making the determination comprises the step of determining that the location is outside the cell boundary if the measured RSSI exceeds an RSSI threshold or if one or more of a selected set of the calculated BER-levels exceed a BER threshold.

18. The method of claim 17 wherein a fading range is defined to extend from the average RSSI-level down a predetermined number of decibels, and wherein the selected set of calculated BER levels are derived from the RDT-attenuated signals whose RSSI-levels fall within the fading range.

19. The method of claim 16 wherein the step of inserting an attenuation comprises the step of setting the RSSI-levels of the RDT-attenuated signals so that they fall within a predetermined testing range of values.

20. The method of claim 19 wherein the testing range extends from the RSSI threshold to 16 dB below the RSSI threshold.

21. The method of claim 20 wherein the step of setting the RSSI-levels of the RDT-attenuated signals comprises the step of setting the signals to 16 different RSSI-levels that are evenly spaced across the testing range.

22. The method of claim 19 wherein the testing range extends from the RSSI threshold to 32 dB below the RSSI threshold.

23. The method of claim 22 wherein the step of setting the RSSI-levels of the RDT-attenuated signals comprises the step of setting the signals to 32 different RSSI-levels that are evenly spaced across the testing range.

24. The method of claim 16 wherein the step of estimating an average RSSI-level comprises the step of combining RSSI measurements of the RDT-attenuated signals using a weighted averaging method.

25. The method of claim 16 wherein the step of calculating a bit error rate (BER) level for each RDT-attenuated signal, comprises the step of combining, for each calculation, BER measurements of the RDT-attenuated signal with an average of BER measurements calculated using previously received RDT- attenuated signals at a like RSSI-level, said combining being done using a weighted averaging method.

26. A radio deployment tool (RDT) comprising:

a wireless handset comprising means for transmitting a test signal containing a transmitted test sequence to the base station; and a base station comprising means for receiving a received signal from the wireless handset, an RSSI detector for measuring the received signal strength intensity (RSSI) level of the received signal, a processor for calculating a bit error rate (BER) of a received sequence carried by the received signal and for comparing the RSSI and the BER-levels to RSSI and BER thresholds, respectively, in making a determination that the handset is outside a cell boundary of the base station if the RSSI is less than the RSSI threshold and making a determination that the handset is outside a cell boundary of the base station if the BER is greater than the BER threshold, and an indicating device for communicating the determination to a user.

27. The RDT of claim 26 wherein the base station additionally has a means for varying the RSSI-level of the received signal to a level lying inside a testing range.

28. The RDT of claim 28 wherein the means for varying the RSSI-level includes adjustable attenuation pads, adjustable antennas, and means for controlling the receive-sensitivity.

29. The RDT of claim 26 wherein the indicating device comprises a transmitter for communicating a message containing the determination to the wireless handset, and wherein the wireless handset further comprises a receiver for receiving the message from the base station, and a man-machine interface device (MMI) for communicating the determination to the user.

30. A radio deployment tool (RDT) comprising:

a wireless handset comprising means for transmitting a test signal containing a transmitted test sequence to the base station; and a base station comprising means for receiving a received signal from the wireless handset, an RSSI detector for measuring the received signal strength intensity (RSSI) level of the received signal, a processor for calculating a bit error rate (BER) of a received sequence carried by the received signal and for comparing the RSSI and the BER-levels to RSSI and BER thresholds, respectively, in making a determination that the handset is outside a cell boundary of the base station if the RSSI is less than the RSSI threshold and making a determination that the handset is outside a cell boundary of the base station if the BER is greater than the BER threshold, and an indicating device for communicating the determination to a user;

wherein the wireless handset further comprises a mute button for producing a known test sequence of zero-bits, and a scrambler for scrambling the known test sequence thereby producing the transmitted test sequence, and wherein the base station further comprises a descrambler for descrambling the contents of a scrambled received sequence thereby creating the received sequence, and a processor for counting the number of non-zero bits in the received sequence.

31. The RDT of claim 30 wherein the wireless handset is a standard personal communications systems (PCS) mobile unit.

32. The RDT of claim 30 wherein the means for transmitting a test signal and the means for receiving a received signal both operate in accordance with the Digital European Cordless Telecommunications (DECT) protocol.

33. The RDT of claim 30 wherein the means for transmitting a test signal and the means for receiving a received signal both operate in accordance with the Group Special Mobile (GSM) protocol.

34. A base station for obtaining, for base station deployment purposes, a determination of whether or not a location falls outside or inside its cell boundary, the apparatus comprising, an RSSI detector for measuring the received signal strength intensity (RSSI) level of a received signal originating from the location, a processor for measuring the bit error rate (BER) level of a received sequence carried by the received signal and for considering both levels in making the determination such that if the BER fails a respective threshold test the determination is made that the location falls outside the cell boundary, and if the RSSI fails a respective threshold test the determination is made that the location falls outside the cell boundary, and an indicating device for communicating the determination.

* * * * *